United States Patent [19]

Lansdowne

[11] Patent Number: 5,737,323
[45] Date of Patent: Apr. 7, 1998

[54] RADIO TELEPHONE

[75] Inventor: Richard Lansdowne, Chandlers Ford, England

[73] Assignee: Nokia Mobile Phones Limited, Salo, Finland

[21] Appl. No.: 597,640

[22] Filed: Feb. 6, 1996

[30] Foreign Application Priority Data

Feb. 7, 1995 [GB] United Kingdom ............ 9502381

[51] Int. Cl.⁶ ........................................... G08C 17/00
[52] U.S. Cl. ........................... 370/311; 455/38.3; 455/343
[58] Field of Search ............................ 370/310, 321, 370/311, 324, 326, 346; 455/38.1, 38.2, 38.3, 343; 340/825.08

[56] References Cited

U.S. PATENT DOCUMENTS

| | | | |
|---|---|---|---|
| 4,181,893 | 1/1980 | Ehmke | 328/492 |
| 4,305,041 | 12/1981 | Frerking | 328/155 |
| 4,837,854 | 6/1989 | Oyagi et al. | 455/343 |
| 5,296,849 | 3/1994 | Ide | 340/825.44 |
| 5,384,564 | 1/1995 | Wycoff et al. | 340/825.44 |
| 5,493,285 | 2/1996 | Yoshizawa | 340/825.44 |

FOREIGN PATENT DOCUMENTS

| | | |
|---|---|---|
| 0305200 A2 | 3/1989 | European Pat. Off. |
| 0351230 A2 | 1/1990 | European Pat. Off. |
| 0461849 A2 | 12/1991 | European Pat. Off. |
| 0499440 A2 | 8/1992 | European Pat. Off. |
| 0 509 649 A | 10/1992 | European Pat. Off. |
| 0560320 A1 | 9/1993 | European Pat. Off. |
| 0 586 256 A | 3/1994 | European Pat. Off. |
| 0619685 A2 | 10/1994 | European Pat. Off. |
| 0622966 A1 | 11/1994 | European Pat. Off. |
| 1410396 | 10/1975 | United Kingdom. |
| 2019054 | 10/1979 | United Kingdom. |
| 2167254 | 5/1986 | United Kingdom. |
| WO 91/16670 | 10/1993 | WIPO. |
| WO 95 10141 | 4/1994 | WIPO. |

*Primary Examiner*—Douglas W. Olms
*Assistant Examiner*—Ajit Patel
*Attorney, Agent, or Firm*—Perman & Green, LLP

[57] ABSTRACT

A mobile telephone has a high frequency system clock (41) and a processor (61) arranged to process polling signals received while the telephone is in its standby condition. When polling signals are not being received, it is possible for the telephone to be placed in a sleep condition, by de-activating the system clock. Re-activation occurs in response to a calibrated number of clock cycles produced by a lower frequency sleep clock (65). Upon re-activation, system clock counters (43,44), specifying sub-frame periods and frame periods are re-loaded so that they may be re-activated at the required phase. The phase of these counters is compared with signals received from base stations and modifications are made to system counts as required. The extent to which modifications are required is also used to re-calibrate the sleep clock.

14 Claims, 4 Drawing Sheets

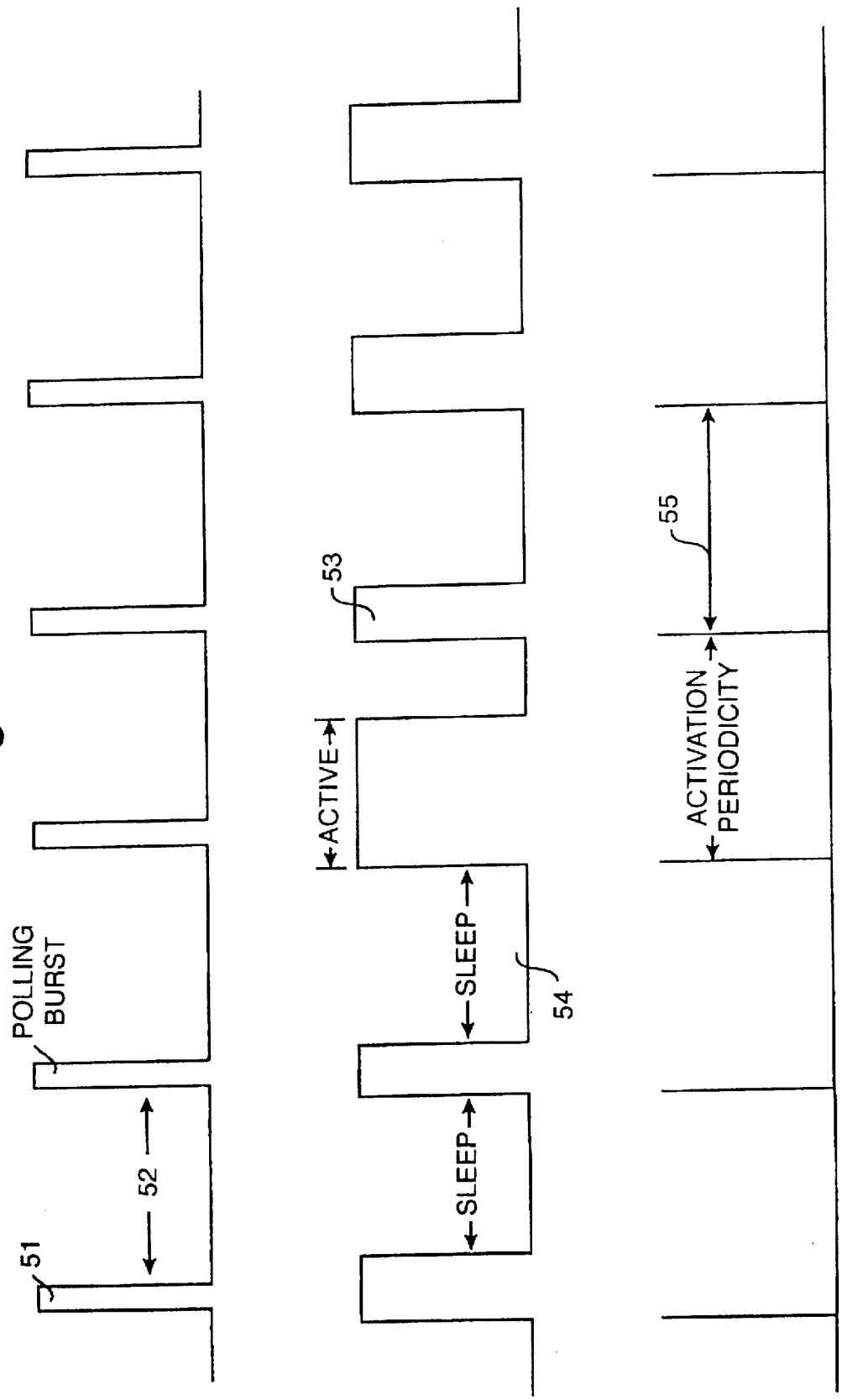

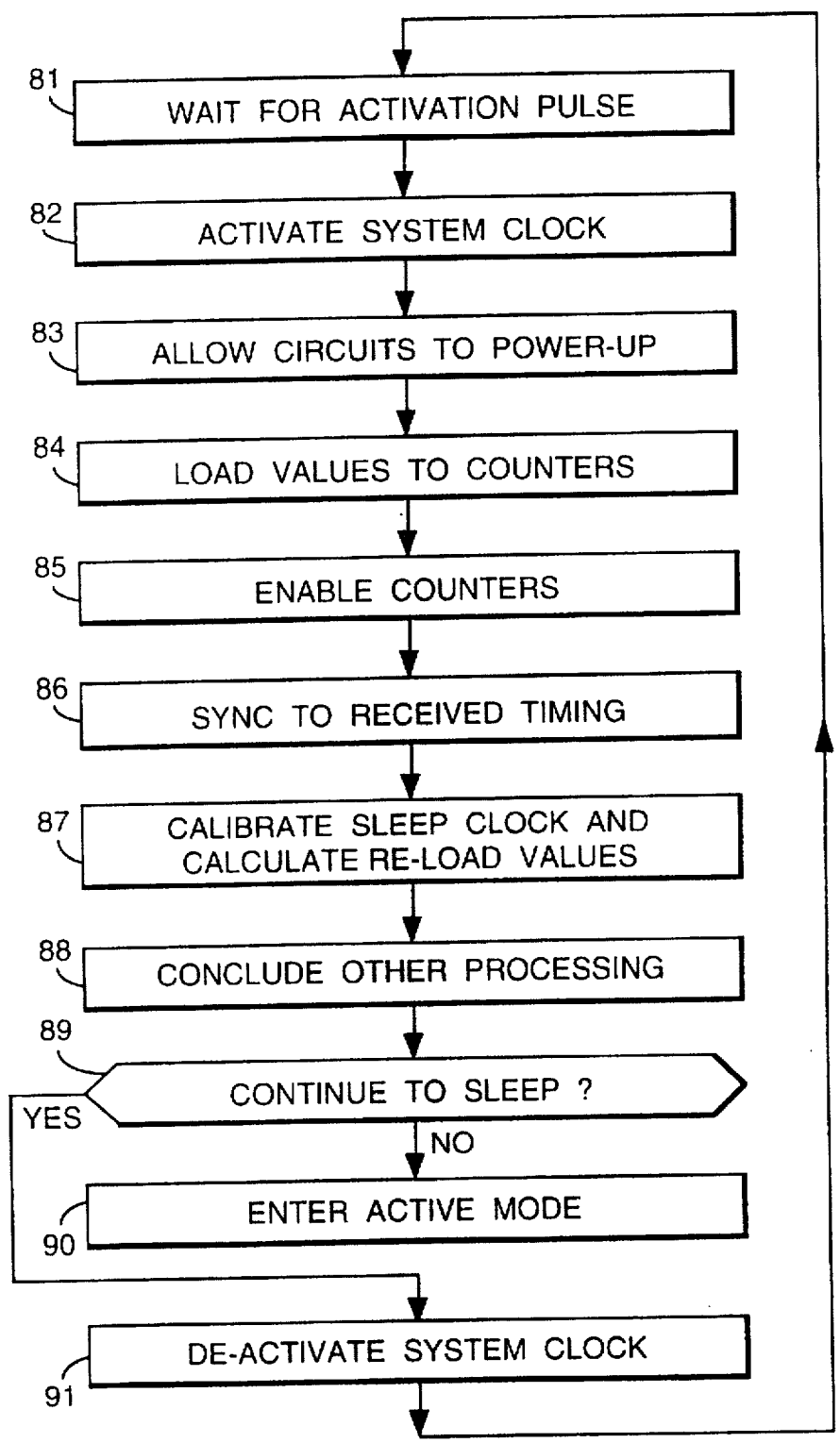

RADIO TELEPHONE

BACKGROUND OF THE INVENTION

The present invention relates to a radio telephone having a high frequency system clock and processing means. In particular, the present invention relates to a radio telephone in which said processing means is arranged to process polling signals received during a predetermined portion of a repeated periodic cycle.

In digital mobile telephones, a highly accurate high frequency system clock produces a clock signal at a frequency in the tens of megahertz. During a communicating mode of operation, the clocking signal is required continuously, so as to accurately align transmitted data and received data within a time and frequency multiplex established by an operating network.

A problem with mobile telephones of this type is that the processing circuitry demands significant levels of battery power, therefore it is desirable to de-activate this circuitry when it is not actually required. In many situations, de-activation periods may be assessed with reference to a predetermined count of system clock pulses. However, given the high frequency of the system clock, this in itself represents a component which places significant demands upon the power supply and, preferably, it would be desirable to de-activate the system clock when it is not actually required. Clearly, this creates a problem, given that, under normal circumstances, it would be the system clock itself which provided a measure of de-activation periods.

European Patent Publication No. 0 586 256 discloses a mobile telephone in which a relatively low quality, low frequency clock is provided in addition to the high frequency system clock. A system clock is used to determine the accuracy and stability of the low frequency clock, hence allowing said low frequency clock to be calibrated with reference to the system clock. It is then possible to de-activate the system clock for predetermined durations, during which said system clock may be referred to as entering a "sleep mode". The duration of the sleep mode is measured with reference to the low frequency "sleep clock", whereafter the high frequency system clock is re-activated for the subsequent processing of data.

Thus, in this way, it is possible for the system clock to be de-activated when the telephone is in its stand-by condition. The system clock is required to be re-activated in anticipation of receiving polling signals, contained within a specific polling frame within each superframe. Thereafter, a sleep duration may be assessed and measured by counting pulses generated by the sleep clock. Thereafter, the system clock is re-activated in anticipation of receiving the next burst of polling signals.

A problem with this known proposal is that further processing time must be used in order to calibrate the sleep clock. Furthermore, conditions may exist during which the sleep clock frequency varies to such an extent that it is not possible to enter sleep mode for a significant number of cycles. Thus, in order to maintain effective and active calibration of the sleep clock, it is necessary to perform substantially more additional processing so as to effect the calibration which in turn offsets savings made in terms of being able to enter sleep mode.

SUMMARY OF THE INVENTION

According to a first aspect of the present invention, there is provided a mobile telephone having a high frequency system clock and processing means arranged to process polling signals received during a predetermined portion of a repeated periodic cycle, comprising first counting means for counting system clock pulses; a low frequency sleep clock; second counting means for counting sleep clock pulses; means for de-activating the system clock; means for re-activating said system clock after a calibrated number of sleep clock pulses; means for re-loading the first counting means; and calibration means for calibrating the calibrated number by comparing the re-set system clock count with base station timing signals.

First, the invention provides the advantage of giving accurate sleep clock calibration while minimising additional requirements on processing time and hardware.

In a preferred embodiment, the first counting means is re-set to specify a new sub-frame and frame count consistent with the re-activation time.

Preferably, the system clock is de-activated after the completion of cycle processing. Thus, de-activation occurs at the optimum time, so as to maximise sleep durations. Preferably, system clock re-activation occurs at a predetermined position within each repeated periodic cycle. Thus, in the preferred embodiment, re-activation points are generated independently of de-activation points and it is not necessary for the system to calculate sleep durations.

Comparisons with base station timing signals may be made at any appropriate rate. However, in a preferred embodiment, the re-loaded system clock count is compared with base station timing signals on each cycle. Preferably, a calibrated number is also calibrated on each cycle so as to optimise system re-activation on each cycle.

BRIEF DESCRIPTION OF THE DRAWINGS

FIG. 5 shows a timing diagram of polling bursts and activation periods;

FIG. 7 illustrates procedures executed in order to facilitate operation of the sleep clock shown in FIG. 6.

DETAILED DESCRIPTION OF THE INVENTION

Figure 1:
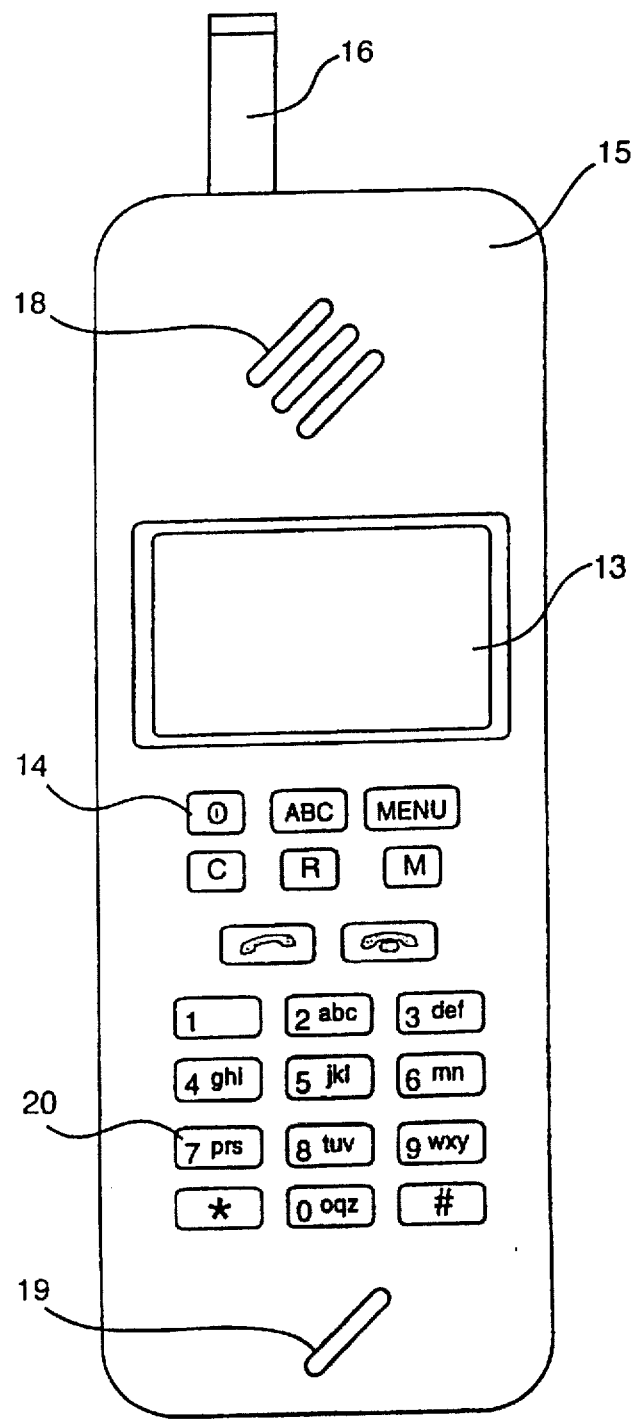
FIG. 1 shows a digital mobile telephone arranged to communicate with base stations using a frame structure to facilitate time division multiplexing.

A mobile telephone is shown in FIG. 1, contained within a plastic housing 15, with an antenna 16 extending from said housing to facilitate communication between the mobile telephone and cellular base stations. The telephone includes an earpiece 18 and a microphone 19, along with manually operable keys 20 and a liquid crystal display 13.

The telephone includes an on/off switch 14 such that, when not required, the telephone may be switched off so as to conserve battery power. A nickel-cadmium battery pack is attachable to the rear of the telephone and the ability to conserve battery power will significantly affect the duration between battery re-charging or battery replacement.

When switched on, by operation of switch 14, the telephone has essentially two modes of operation. In a first mode, the telephone is placed in a stand-by condition. In this stand-by condition, the telephone is not usable as such but remains active, so that it is receptive to polling signals transmitted by base stations. Furthermore, it is also in a condition responsive to manual key operation. Thus, in its stand-by condition, the telephone is effectively waiting for a call to be established by the telephone user or by someone wishing to contact the telephone user.

When a call is set up either by the telephone user or by someone calling the user, the telephone must enter its second mode of operation, under which communication channels are established between the telephone and a cellular base station. The telephone communicates with base stations using an encoded digital time-multiplex, in which an allocated transmission frequency band is divided, over time, into a plurality of channel frames.

In its stand-by condition, it is not necessary for the mobile telephone to have channel bandwidth allocated thereto but, as previously stated, it is necessary for the telephone to receive polling signals from base stations, so that the telephone may be polled when a calling party attempts to establish a communication channel to the telephone.

The actual division of communication links into channel frames and the subdivision of these frames into data symbols involves a number of parameters which are selectable for particular communication standards and, to some extent, adjustable within these standards. Thus, a telephone may be programmed to be adaptable, such that the fully defined mode of operation is determined by a network, which in turn communicates with the mobile telephone so as to complete its programming for operation within that network. It should therefore be understood that many of the numerical values given in the following disclosure are only examples and that many modifications could be made while still failing within the scope of the present invention.

An operational network will have a plurality of radio frequencies allocated thereto and the total number of frequencies will determine the total number of calls which may be simultaneously connected within each particular cell. In addition to providing actual communication between mobile telephones and base stations, it is also necessary to transmit signalling commands, so as to facilitate the connection of calls and the switching of communications between base stations. The signalling instructions are also transmitted using the frame structure, therefore some frames will have a different character to that of others. It is necessary for the system, at any particular time, to be aware of the type of frame that is being transmitted, therefore the frame structure is repeated in a predictable way. Thus, each transmitted frame contains a fixed number of data symbols and a predetermined number of these frames constitute the total period of a repeated cycle.

Figure 2:
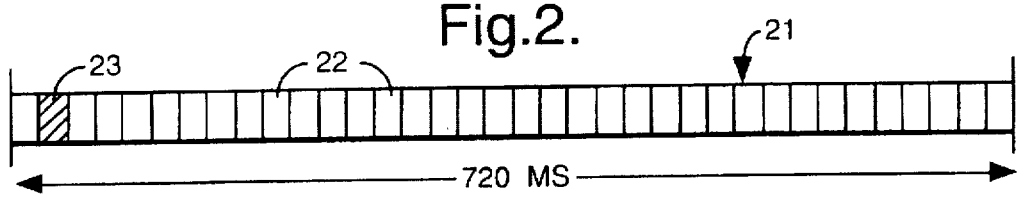
FIG. 2 illustrates a frame structure, consisting of thirty six repeated frames.

A group of repeated frames is referred to as a superframe, or multiframe, and a superframe structure 21 for the present embodiment is shown in FIG. 2. The superframe 21 is transmitted over 720 milliseconds and includes a total of thirty six frames 22. Frame 23, shown shaded in FIG. 2, includes polling information which may be considered as a burst of information identifying unique numbers for particular mobile telephones, thereby identifying telephones which are being called and require a call to be answered. Thus, when a mobile telephone is not actually communicating with a base station, a significant proportion of its operating circuitry may be de-activated so as to reduce power consumption. However, it is essential that, within each superframe, the telephone is capable of analysing information transmitted during each polling frame.

Figure 3:
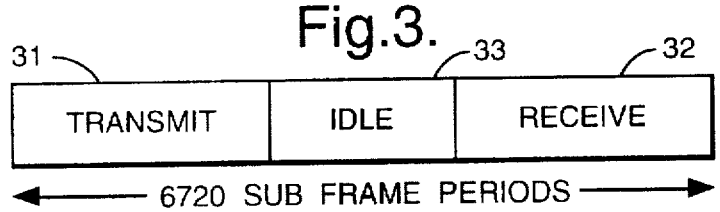
FIG. 3 shows the division of each of the frames illustrated in FIG. 2 into transmission and reception portions.

A frame 22 is detailed in FIG. 3 and consists of 6720 sub-frame periods. The sub-frame period frequency defines the output sample rate, therefore it is necessary for the output digital circuitry to produce an output value at the sub-frame period rate and, similarly, input signals are sampled at this rate. As shown in FIG. 3, each frame includes a transmit portion 31 and a receive portion 32, separated by an idle portion 33. Thus, during the transmit portion 31 data is transmitted from the mobile telephone to a base station at the sub-frame rate while, similarly, during the receive portion, data is received by the mobile telephone at this rate. Thus, the whole system operates within an accurately synchronised environment in which the clocking of signals within each mobile telephone must be synchronised to clocking signals generated by base stations.

Figure 4:
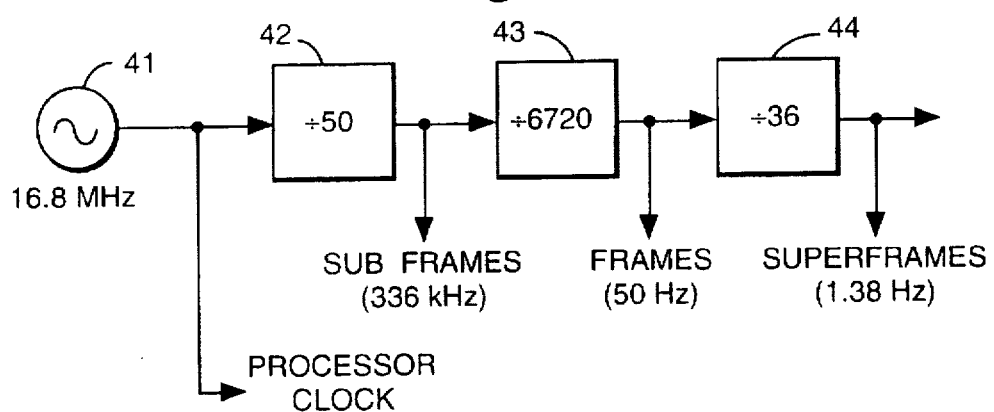
FIG. 4 shows a system clock along with counters for reducing the frequency of pulses generated by the clock.

The mobile telephone includes an accurate system clock arranged to produce clocking signals at 16.8 MHz. Internal circuitry within the mobile telephone, including a digital signal processing circuit, receives these processor clock signals directly and executes instructions in response to these signals. Timing signals, to identify the start of sub-frames, frames and super frames, are generated by counting system-clock signals in a cascaded chain of counters or frequency dividers. Such a chain is illustrated in FIG. 4.

An output from a system clock 41 at 16.8 MHz is supplied to a first frequency divider 42 arranged to divide the system clock's frequency by 50. Thus, the first counter 42 produces sub-frame clocks at 336 kHz, each identifying the start of a sub-frame period, as identified in FIG. 3. The output from counter 42 is also supplied to a second counter 43, arranged to divide the clock frequency by 6720. Referring to FIG. 3, it can be seen that each frame is made up of 6720 sub-frame periods, therefore the output from counter 43 produces clocking signals at the frame rate of 50 Hz. Similarly, the output from counter 43 is supplied to a third counter 44, arranged to divide the clocking frequency by 36, to produce superframe clocks at 1.38 Hz.

At any particular instance, the output from counters 42, 43 and 44 identifies a particular sub-frame period, within a particular frame of a superframe. These values are also compared with reference signals received from base stations and, where appropriate, modifications are made to the counters so as to bring the operation of the mobile telephone accurately into phase with network clocks. Thus, during each superframe cycle, the mobile telephone may compare its internal clocking signals with network clocks, to ensure that the operation of the mobile telephone is accurately synchronised to the network.

When placed in its stand-by condition, the system clock and much of the processing circuitry may be de-activated for substantial portions of each superframe, provided that circuitry is re-activated so as to be ready to receive polling information during the polling frames 23. These polling bursts are illustrated diagrammatically in FIG. 5. Each polling burst 51 represents a period during which the telephone must be active and capable of receiving and analysing information transmitted during the polling burst. At other times, during intervals 52, it is not necessary for the telephone to communicate with base stations, given that no polling information is being transmitted. However, the telephone may be required to perform other processing operations, therefore it will be necessary for the telephone to remain active for a short period after the transmission of the polling burst. Similarly, the operation of the telephone must have stabilised prior to the polling burst being transmitted, therefore it is necessary for the system clock to be activated slightly before the polling burst is transmitted.

Periods during which a telephone must be placed in an active condition are illustrated as active periods 53. Each active period 53 starts at a predetermined interval before a polling burst 51 is transmitted. The telephone remains active throughout the transmission of the polling burst 51 and may then de-activate after processing has been completed. Thus, between each active pulse 53 a duration is provided, identified as sleep duration 54, during which the system clock may be de-activated, effectively placing the telephone into a sleep condition.

It can be appreciated from FIG. 5 that the duration of the active intervals is variable, given that the degree of processing required by the telephone will also vary from cycle to cycle. In order for the system clock to be de-activated, a lower frequency sleep clock is included, which may be calibrated with reference to the system clock. In previous systems, a routine is included that calculates the duration of the subsequent sleep period 54 during each active period 53. A system clock may then be de-activated and the system placed in its sleep condition for the appropriate duration 54, as measured by the low frequency sleep clock.

In the present embodiment an improved approach is provided to placing the system clock into its sleep condition. As previously stated, the sleep durations 54 are variable and the optimum point at which the system clock may be placed in its sleep mode will vary relative to the cycle phase. However, in the present embodiment, exploitation is made of the fact that the point at which re-activation is required does not need to vary with reference to the cycle phase. Thus, the duration of active pulses 53 is variable because the point at which de-activation occurs varies with reference to the cycle phase. However, it can be noted by comparing activation periods 53 with polling burst 51, that the optimum reactivation point does not vary with reference to the cycle phase. Thus, in preference to calculating variable sleep durations for each sleep cycle, an activation periodicity 55 is calculated.

The sleep clock is calibrated with reference to the cycle clock, preferably on each cycle. Thus, the sleep clock is now arranged to calculate durations representing the periods between re-activation points. Circuitry is included which counts a predetermined number of sleep clock pulses during each cycle, so as to produce a re-activation pulse at the required point. Thus, the processor is arranged to effect a de-activating routine after completing the processing required for that particular cycle. In this way, de-activation occurs at the optimum point, after cycle processing, and it is not necessary to calculate a sleep duration. Re-activation then occurs at the predetermined position within the repeated cycle in anticipation of receiving polling signals. Thus, re-activation occurs prior to the polling burst being transmitted, allowing the circuitry to power up and stabilise.

Figure 6:
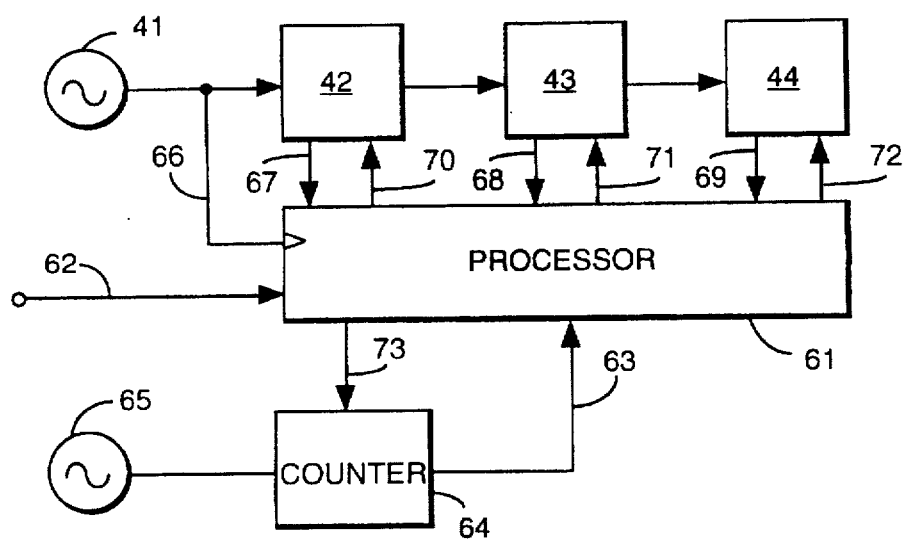
FIG. 6 shows the system clock and counters of FIG. 4, in combination with the processor and sleep clock circuitry.

The system clock 41 and its associated counters 42, 43 and 44 are also shown in FIG. 6. These devices communicate with a digital signal processor 61, which in turn receives external timing signals from base stations via an input line 62. The processor 61, the system clock 41 and associated counters 42,43, and 44 may be placed into a sleep mode, during which the system clock 41 ceases to operate until re-activated by an interrupt signal supplied on a line 63 to the processor 61 from an adjustable counter 64. The adjustable counter in turn receives sleep clock pulses from a low frequency sleep clock 65, operating at approximately 32 kHz.

The system clock 41 clocks processor 61 via a clocking line 66. Counter 42 counts clock pulses from the system clock 41 to generate indications of the start of a sub-frame period, that are supplied to the processor 61 over a data line 67. These reduced frequency clocking pulses are also supplied to counter 43, which in turn supplies indications of the start of frame periods to the processor 61 over line 68. Similarly, counter 44 receives an output from counter 43, as previously described, resulting in indications of the start of superframe periods being supplied to the processor 61 over a line 69.

If so required, the processor 61 may keep a count of superframe periods but it should be appreciated that superframes represent the totality of a repeated cycle and each superframe contains a polling burst.

In addition to receiving signals from counters 42, 43 and 44 over line 67, 68 and 69 respectively, the processor 61 is also arranged to supply new count values to said counters over lines 70, 71 and 72 respectively. Thus, after the system clock 41 has been placed in its sleep mode, the system phase may be restored by downloading new count values to the counters, whereafter they may be re-activated so as to continue counting signals generated by the system clock 41.

The processor 61 also includes routines for checking that the counters 42, 43 and 44 are in phase with signals received from base stations, via line 62. Thus, the processor 61 may compare its local system phase with the network system phase and, where appropriate, modify count values, via data line 70, 71 or 72, so as to bring the count values into phase with the overall network. Thus, the processor 61 is capable of establishing the extent to which its own local system clock count may have drifted from the normal operating phase of the network.

The sleep clock 65 generates sleep clock pulses that are in turn counted by the variable counter 64. The variable counter is controlled by the processor 61, which supplies a count value over line 73. The variable counter 64 is arranged to produce activation pulses at the activation periodicity 55, shown in FIG. 5, by reducing the pulse frequency of the sleep clock. Thus, after counting a number of sleep pulses defined by the value supplied over line 73, the counter 64 generates a re-activation pulse over interrupt line 63, which in turn instructs the processor 61 to re-activate the system if said system has been placed in its sleep mode.

Operation of the system shown in FIG. 6 will be described with reference to the procedure detailed in FIG. 7. Step 81 represents the processor 61 and system clock 41 in sleep mode, during which the system clock 41 is inactive. Thus, the processor 61 is effectively waiting for an activation pulse which, when received via line 63, activates the system clock 41.

At step 83, after activation of the system clock, a short interval is provided, during which circuitry is allowed to power up and stabilise, such that normal processing may be resumed.

Prior to the resumption of normal processing, creating conditions such as to re-establish operation of the processor 61 and system clock 41 as if they had not been placed in sleep mode, the counters 42, 43 and 44 are re-loaded with new values, via data lines 70, 71 and 72 respectively. Thus, the processor 61 and system clock 41 are placed in sleep mode until the re-activation point. The period between re-activation points is specified in terms of a calibrated number of sleep clock pulses. Similarly, at the re-activation position, the counters 42, 43 and 44 should have attained a specified number of system clock counts. Thus, when re-activation occurs, as determined by the sleep clock 65 and counter 64, the values which the counters 42, 43 and 44 would have attained, had the system not been placed into its sleep condition, are effectively re-loaded, such that the said counters may then continue to count as if the sleep condition had not occurred.

Thus, after the counters 42, 43 and 44 have been loaded with new values they are enabled at the appropriate point so as to bring them into phase with the operating environment.

At step 86 the phase of the system counters 42, 43 and 44 is compared with external timing signals received over line 62. If necessary, modifications are made to the values stored in counters 42, 43 and 44 which, under normal operating conditions, would generally result in minor modifications being made to the sub-frame count of counter 43; it generally not being necessary to correct counter 42.

The duration of a sleep clock pulse will not tend to represent an integer number of system clock pulses. Thus, the re-activation points will tend to drift, with reference to the optimum point defined in terms of system clock pulses, therefore re-calibration is required on a continual basis. Consequently, on each cycle, a re-calibration procedure is effected by making reference to the extent to which the system counters 42, 43 and 44 and in particular counter 43, are out of phase with the external timing signals received over line 62. Thus, in response to this calibration, it may be determined that the sleep clock has effectively slowed down, in which case fewer counts are required by counter 64 in order to re-activate the system clock at the optimum point. Alternatively, the sleep clock may be perceived as having speeded up slightly, in which case fewer counts are required.

Even while sleep clock 65 remains oscillating at constant frequency, the activation point will tend to drift, therefore occasionally a cycle is required in which fewer counts are made by counter 64 or more counts are made by counter 64. Thereafter, the count is re-adjusted on the next cycle and the process continues. Thus, the activation point, as determined by counter 64, may drift slightly with reference to the optimum point defined in terms of system clock pulses but, on each cycle, it will be modified such that the activation point, defined by the sleep clock, does not drift beyond an extent to which it is possible for the processor 61 to recover the situation, with reference to signals received externally.

Thus, after step 87, whereupon the sleep clock is calibrated and a new count number supplied to counter 64, other processing steps required within the cycle are concluded and at step 89 a question is asked as to whether sleep mode should be maintained.

The conclusion of other processing at step 88 involves examining data received in the polling burst and this data may represent a call to the mobile telephone, requesting the establishment of a connection to a base station. Under these conditions, the question asked at step 89 is answered in the negative and the active mode is entered at step 90, under which the system clock 41 is maintained operative and measures are undertaken to establish a call.

Alternatively, if the telephone is not required to establish a call to a base station, resulting in the question asked at step 89 being answered in the affirmative, control is directed to step 91, whereupon the system clock is de-activated and the system returned to its sleep mode.

Thus, it can appreciated from the above, that the system provides continual re-calibration of the sleep clock, thereby ensuring that sleep durations are optimised and that the processor 61 is always re-activated in anticipation of polling bursts.

What is claimed is:

1. A mobile telephone having a high frequency system clock and processing means arranged to process polling signals received during a predetermined portion of a repeated periodic cycle, comprising:

first counting means for counting system clock pulses derived from said high frequency system clock;

a low frequency sleep clock providing sleep clock pulses;

second counting means for counting said sleep clock pulses;

means for de-activating said system clock;

means for re-activating said system clock after a calibrated number of said sleep clock pulses;

means for re-loading said first counting means to provide a re-set system clock count; and calibration means for calibrating said calibrated number by comparing said re-set system clock count with timing signals received from a base station.

2. A mobile telephone according to claim 1, wherein the system clock oscillates at a frequency of between 5 MHz and 20 MHz.

3. A telephone according to claim 1, wherein polling signals are received during a predetermined portion of a periodic transmission structure transmitted by the base station.

4. A telephone according to claim 3, wherein each transmission structure is a superframe multiplex comprising between ten and fifty frame periods.

5. A telephone according to claim 1, wherein de-activation occurs when the telephone is in its standby mode.

6. A telephone according to claim 1, wherein the first counting means reduces the system clock frequency to specify the start of a sub-frame period, a frame period and a superframe period.

7. A telephone according to claim 6, wherein the first counting means is re-loaded to specify a new sub-frame and frame count consistent with the re-activation time.

8. A telephone according to claim 1, wherein the sleep clock frequency is substantially lower than the system clock frequency.

9. A telephone according to claim 1, wherein the system clock is de-activated after the completion of cycle processing.

10. A telephone according to claim 9, wherein system clock re-activation occurs at a predetermined position within each repeated periodic cycle.

11. A telephone according to claim 1, wherein the re-loaded system clock count is compared with base station timing signals on each cycle.

12. A telephone according to claim 11, wherein the calibrated number is calibrated on each cycle so as to optimise system re-activation on each cycle.

13. A method for operating a mobile telephone in a sleep mode, comprising the steps of:

producing system clock pulses from a system clock;

producing sleep clock pulses from a sleep clock; counting the system clock pulses with a system clock counter;

de-activating the system clock and entering the sleep mode;

counting the sleep clock pulses with a sleep clock counter, while in the sleep mode;

re-activating the system clock after a predetermined number of sleep clock pulses;

after re-activating the system clock, re-loading the system clock counter to provide a re-set system clock; and re-determining the predetermined number of sleep clock pulses by comparing the re-set system clock count with a signal received from a base station.

14. A method for operating a mobile telephone according to claim 13, wherein the system clock is de-activated after a completion of processing operations that are performed periodically by the mobile telephone.

* * * * *